Patented Feb. 19, 1935

1,992,014

UNITED STATES PATENT OFFICE 1,992,014

MOTOR FUEL PRODUCT

Thomas H. Rogers, Hammond, Ind., and Robert E. Wilson, Chicago, Ill., assignors, by mesne assignments, to Gasoline Antioxidant Company, Wilmington, Del., a corporation of Delaware No Drawing. Application January 26, 1932, Serial No. 589,050

10 Claims. (Cl. 44—9)

The present invention relates to the treatment of highly cracked gasolines or hydrocarbon motor fuel distillates of the type which are normally unstable, particularly with respect to gum formation on storage and on evaporation and which, having an initial anti-knock rating superior to that of straight-run gasoline, tend to deteriorate in anti-knock rating on storage. It is particularly concerned with the highly cracked motor fuel products such as those derived by high temperature cracking, say at temperatures of 900° F. and higher and more particularly by such processes conducted at lower pressures and commonly designated vapor phase processes. The tendency of products of this type to develop gum-forming constituents and to deteriorate in anti-knock is indicated, for example, by their oxygen absorption induction period, determined, for example, as described in the article by Voorhees and Eisinger in Proceedings of the American Petroleum Institute, Section II, January 3, 1929, Page 170, the oxygen absorption induction period designating the period of time for which the rate of absorption of oxygen at an elevated temperature of 210 to 212° F. on agitation in an atmosphere of oxygen under 2.5 atmospheres pressure remains below 1 cc. per minute per 100 cc. motor fuel.

It has hitherto been proposed to prevent gumming and deterioration of such products, which are normally color stable, by incorporating therein minute proportions of gum inhibiting aromatic reducing agents, such as alpha-substituted naphthalene derivatives, for example, alpha-naphthol, alpha-naphthylamine, para-phenylene diamine, para-aminophenol and the like. It has been found, however, that the incorporation of many such agents preventing gum formation and deterioration of anti-knock causes instability of color of the initially color stable material, with the result that the color thereof rapidly goes off or becomes darker on exposure to either direct sunlight or diffused sunlight. This phenomenon appears to be due to a photo chemical decomposition of the gum inhibiting aromatic compounds.

It has now been found that the instability to light of such treated products may be prevented by incorporating therein small proportions of ammonia derivatives including ammonia and its hydrocarbon-radical substituted derivatives, the organic amines, for example, alkyl amines, such as diethyl amine, tributyl amine, ethyl amine, alkylene amines, such as propylene diamine and ethylene diamine, basic cyclic nitrogen compounds, such as piperidine and the like. The proportion of the ammonia derivative incorporated may vary from 0.0005% to 0.05% or more, only sufficient being employed, of course, to secure the desired color stabilizing effect without substantially modifying the effect of the alpha-substituted naphthalene derivative with respect to prevention of gum formation. In general, from 0.001% to 0.005% of the amines body is found to be sufficient. In the case of ammonia the desired proportion may be secured by passing ammonia into the fuel to secure from a perceptible trace to a saturated solution. The amines have the advantage over ammonia in their lower volatility which reduces the danger of their being lost from the gasoline by evaporation. The following example illustrates the invention:

An initial stock was prepared, sweetened and treated, showing satisfactory color stability but showing a high gum test and developing gum-forming constituents rapidly on storage. Its oxygen absorption induction period was about 100 minutes. Substantial color stability was indicated by the fact that on 10 days exposure to both direct sunlight and diffused light, it changed only from an initial color of 25 to a color of 20. 0.005% of alpha-naphthol were added in order to impart substantial stability with respect to gum formation and to prevent deterioration in anti-knock, the oxygen absorption induction period being increased thereby to about 300 minutes. The product, thus treated, was found to have lost color stability, degrading under identical conditions of light exposure from an initial color of 25 to a final color of 6. By adding thereto 0.003% diethylamine, the stability of the product with respect to gum formation and anti-knock rating resulting from the use of the alpha-naphthol was maintained and color stability was likewise imparted, as indicated by a degradation in color under the same conditions of light exposure only from an initial color of 25 to a final color of 15. On continued storage in diffused light for a period of nine months the control sample and the sample of gasoline containing the alpha-naphthol inhibitor deteriorated in color to such an extent that their color could not be measured on the Saybolt instrument (below —15). The sample treated with diethyl amine, however, had maintained its color and even improved slightly, being 17 Saybolt. With 0.003% of tributyl amine added to the same alpha-naphthol-containing stocks, and under the same conditions of color exposure, the drop in color was from an initial value of 25 to a final value of 12. With a trace of or by saturation with ammonia in place of the amine, under the same conditions color-stability was substantially improved, as shown by a drop from an initial value of 25 to a value of 15.

In a similar manner, alpha-naphthylamine was added in an amount of .01% to a gum forming cracked gasoline for the purpose of preventing gum formation. The color stability of the gasoline was originally quite satisfactory as indicated by the fact that its Saybolt color decreased only from 26 to 25 on five days exposure to diffused daylight. After the addition of the alpha-naphthylamine the color decreased from 26 to 10° Saybolt under the same conditions of exposure. To another sample of the gasoline containing the alpha-naphthylamine, there was added .005% diethyl amine whereupon the sample was subjected to the same conditions of light exposure above-mentioned. The color degradation occurring in this case was much less being only from 26 to 19 in five days, illustrating the color stabilizing effect of the alkyl-amine.

Similar results are secured by the use of other substituted amines as hereinbefore indicated, in counteracting the color degradation resulting from the employment of alpha-naphthol and other alpha-substituted naphthalene derivatives and other inhibiting aromatic reducing agents tending to produce color instability, such as para-phenylene diamine, para-aminophenol, P, P' diamino hydrazo benzene and the like, employed to stabilize a stock initially unstable with regard to gum formation and deterioration.

Although the present invention has been described in connection with the details of certain specific examples thereof, it is not intended that these shall be regarded as limitations upon the scope of the invention, except in so far as included in the accompanying claims.

We claim:

1. The method of imparting color stability to a hydrocarbon motor fuel comprising a cracked hydrocarbon distillate containing a small proportion of an added gum formation inhibiting agent selected from the class consisting of an aromatic amino compound, a phenolic compound and an amino phenolic compound of the type that tends to cause color degradation in the fuel, which comprises adding thereto along with said gum inhibiting agent a small proportion of an alkyl amine in quantity sufficient to retard said color degradation.

2. The method of imparting color stability to a cracked hydrocarbon motor fuel containing a small proportion of an added gum formation inhibiting agent selected from the class consisting of alpha-naphthol, alpha-naphthylamine, para-phenylenediamine, P-P'-diaminohydrazobenzene, and para-amino-phenol which tends to cause color degradation in the fuel, which comprises adding thereto along with said gum inhibiting agent a small proportion of an alkyl amine in quantity sufficient to retard said color degradation.

3. The method of imparting color stability to a cracked hydrocarbon motor fuel containing a small proportion of an added gum formation inhibiting agent selected from the class consisting of alpha-naphthol, alpha-naphthylamine, para-phenylenediamine, di-aminohydrazobenzene, and para-amino-phenol which tends to cause color degradation in the fuel, which comprises adding thereto along with said gum inhibiting agent a small proportion of an aliphatic alkylene polyamine in quantity sufficient to retard said color degradation.

4. The method of imparting color stability to a cracked gasoline containing a small proportion of an added gum formation inhibiting agent selected from the class consisting of alpha-naphthol, alpha-naphthylamine, para-phenylenediamine and a para-aminophenol which tends to cause color degradation in the fuel, which comprises adding thereto along with said gum inhibiting agents a small proportion of a color stabilizing agent selected from the class consisting of ammonia and alkyl amines to retard said color degradation.

5. A motor fuel product comprising a cracked hydrocarbon distillate and a small proportion of alpha-naphthol as a gum formation inhibiting agent, whereby the fuel product is rendered unstable with respect to color formation, together with a small proportion of a butyl amine to retard said color formation.

6. A motor fuel product comprising a cracked hydrocarbon distillate and a small proportion of para-phenylenediamine as a gum formation inhibiting agent, whereby the fuel product is rendered unstable with respect to color formation, together with a small proportion of a butyl amine to retard said color formation.

7. A motor fuel product comprising a cracked hydrocarbon distillate and a small proportion of a para-aminophenol as a gum formation inhibiting agent, whereby the fuel product is rendered unstable with respect to color formation, together with a small proportion of a butyl amine to retard said color formation.

8. A motor fuel product comprising a cracked hydrocarbon distillate and a small proportion of alpha-naphthylamine as a gum formation inhibiting agent, whereby the fuel product is rendered unstable with respect to color formation, together with a small proportion of a butyl amine to retard said color formation.

9. A motor fuel product comprising principally a cracked hydrocarbon distillate normally unstable with respect to gum formation and stable with respect to color and a small proportion of alpha naphthol as a gum formation inhibiting agent, whereby the fuel product is rendered stable with respect to gum formation and unstable with respect to color formation, together with a small proportion of an alkyl amine.

10. A motor fuel product comprising principally a cracked hydrocarbon distillate normally unstable with respect to gum formation and stable with respect to color and not more than about 0.005% of alpha-naphthol as a gum formation inhibiting agent, whereby the motor fuel is rendered stable with respect to gum formation and unstable with respect to color formation, together with about 0.001 to 0.005% of tributylamine.

ROBERT E. WILSON.
THOMAS H. ROGERS.